United States Patent
Hossaini et al.

(10) Patent No.: US 6,886,635 B2
(45) Date of Patent: May 3, 2005

(54) FILTER CAKE REMOVAL FLUID AND METHOD

(75) Inventors: Mohammad Hossaini, Houston, TX (US); Joe Murphey, Spring, TX (US); Tom S. Carter, Houston, TX (US); Jeffrey S. McKennis, The Woodlands, TX (US)

(73) Assignee: Tetra Technologies, Inc., Woodlands, TX (US)

( * ) Notice: Subject to any disclaimer, the term of this patent is extended or adjusted under 35 U.S.C. 154(b) by 81 days.

(21) Appl. No.: 10/229,984

(22) Filed: Aug. 28, 2002

(65) Prior Publication Data

US 2004/0040706 A1 Mar. 4, 2004

(51) Int. Cl.$^7$ .............................................. E21B 37/06
(52) U.S. Cl. ........................ 166/312; 166/300; 166/304; 166/307
(58) Field of Search ..................... 166/276, 278, 166/282, 300, 304, 305.1, 307, 312; 507/276, 277

(56) References Cited

U.S. PATENT DOCUMENTS

| | | | |
|---|---|---|---|
| 4,250,044 A | 2/1981 | Hinkel | 252/8.55 R |
| 4,594,170 A | 6/1986 | Brown et al. | 252/8.55 R |
| 4,809,783 A | 3/1989 | Hollenbeck et al. | 166/307 |
| 5,164,099 A | 11/1992 | Gupta et al. | 252/8.55 R |
| 5,253,711 A | 10/1993 | Mondshine | 166/300 |
| 5,373,901 A | 12/1994 | Norman et al. | 166/300 |
| 6,138,760 A | 10/2000 | Lopez et al. | 166/300 |
| 6,140,277 A | 10/2000 | Tibbles et al. | 507/201 |
| 6,143,698 A * | 11/2000 | Murphey et al. | 507/145 |
| 6,357,527 B1 | 3/2002 | Norman et al. | 166/300 |
| 2002/0036088 A1 | 3/2002 | Todd | 166/300 |

OTHER PUBLICATIONS

Syed Ali, et al., Oil & Gas Journal, Feb. 1, 1999, Alternative methods clean up filter cake.

Brad Todd, et al., Halliburton Best Practices Series, AADE 2001, Delayed Breakers for Horizontal Well Cleanup.

* cited by examiner

*Primary Examiner*—Zakiya Walker
(74) *Attorney, Agent, or Firm*—D'Ambrosis & Associates, P.L.L.C.

(57) ABSTRACT

A method for removing filter cake from a subterranean borehole comprising drilling the borehole with a drilling fluid that includes additives to form a filter cake having an oxidation-degradable component, preferably a polysaccharide. The filter cake is contacted with a clear brine containing a mixture of a persulfate salt in a variable density brine to degrade the polymers within the filter cake. The persulfate mixture breaks down the filter cake in well bores having temperatures ranging from about 65° F. to 165° F. Concentration of the persulfate sets the pace of the reaction.

29 Claims, No Drawings

FILTER CAKE REMOVAL FLUID AND METHOD

FIELD OF THE INVENTION

The present invention relates to a composition for removing filter cake from a subterranean borehole and a method for filter cake removal. More particularly, the invention relates to a composition for a filter cake removal fluid comprising a persulfate.

BACKGROUND OF THE INVENTION

The walls of oil and gas formations are exposed during the process of drilling a borehole. The successful completion of a well bore requires the deposit of a low-permeable filter cake on the walls of the well bore to seal the permeable formation exposed by the drilling bit. A filter cake can limit drilling fluid losses from the well bore and protect the natural formation from possible damage by the fluids permeating into the well bore. Solids in the drilling fluid may also damage the formation, particularly drilling fines. The suspension of fine particles that enters the formation while the cake is being established is known as "mud spurt" and the liquid that enters subsequently is known as "filtrate". Both filtration rate and mud spurt must be minimized when penetrating potentially productive formations because productivity may be reduced by any one of the following: the swelling of clays in the formation when they come in contact with the filtrate; particles transported into the pores of the formation that plug flow channels and greatly reduce the permeability of the rock; and the pressure of some reservoirs that is not great enough to drive all of the aqueous filtrate out of the pores of the rock when the well is brought into production. For a filter cake to form, the drilling fluid must contain some particles of a size only slightly smaller than the pore openings of the formation. These particles are known as bridging particles and are trapped in surface pores, thereby forming a bridge over the formation pores. Filter cake building fluids can also contain polymers for suspension of solids and for reducing liquid loss through the filter cake by encapsulating the bridging particles. These can be either natural or synthetic polymers. The polymers can include one polymer such as xanthan selected for its rheological properties and a second polymer, a starch for example, selected for reduction of fluid loss.

At completion of the drilling or other well servicing, the filter cake must be removed to allow production of the formation fluids or bonding of cement to the formation at the completion stage. Removal of the deposited filter cake should be as complete as possible to recover permeability within the formation.

Previous chemical treatments for filter cake removal have employed an acid to dissolve carbonates and/or hydrolyze polysaccharide polymers. Dobson, Jr. et al., U.S. Pat. No. 5,607,905, reveal a process for enhancing the removal of filter cake by the use of inorganic peroxides as oxidizing agents. The process disclosed in the '905 patent incorporates alkaline earth metal peroxides, zinc peroxides or a mixtures thereof within the filter cake as an integral component thereof and then contacts the filter cake with an acidic solution. Hollenbeck et al., U.S. Pat. No. 4,809,783, disclose a method of dissolving a polysaccharide-containing filter cake present in a subterranean formation. The method comprises injecting an effective amount of a treatment fluid having a water soluble source of fluoride ions present in an amount sufficient to provide a molar concentration of from about 0.01 to about 0.5 and a source of hydrogen ions present in an amount sufficient to produce a pH in the treatment fluid in the range of from about 2 to about 4 into a subterranean formation wherein a filter cake is present. The treatment fluid is maintained within the subterranean formation and in contact with the filter cake for a sufficient time to dissolve at least a portion of said filter cake. In Example 1, Hollenbeck describes the addition of an aqueous solution of sodium persulfate to the fluoride solution.

Several of the disclosed references teach the use of perceived high concentrations of persulfate in a fracturing fluid. In U.S. Pat. No. 5,164,099, Gupta et al., claim a method for breaking an aqueous fracturing fluid comprised of introducing an encapsulated percarbonate, perchlorate, or persulfate breaker into a subterranean formation being treated with the fracturing fluid. The encapsulated breaker is comprised of a polyamide membrane enclosing the breaker, the membrane permeable to a fluid in the subterranean formation such that the breaker diffuses through the membrane to break the fracturing fluid with the membrane staying intact. Gupta further claims the persulfate composition, used as an encapsulated breaker within a frac fluid, to be comprised of ammonium persulfate. In U.S. Pat. No. 4,250,044, Hinkle describes a persulfate frac fluid breaker system for reducing the viscosity of fracturing fluids at temperatures ranging from 50° F. to 125° F. The '044 persulfate breaker system must have an activator, a tertiary amine, with the persulfate for the breaking action to be effective. Breaker fluids for breaking fracturing fluids can comprise concentrations of persulfate ranging from ¼ to about 20 lbs of persulfate per 1000 gals. of fluid, Hinkle, col. 5, lines 66 to 70.

Norman et al. in two patents, U.S. Pat. No. 5,373,901 and U.S. Pat. No. 6,357,527, describe a method of breaking an aqueous fracturing fluid comprising introducing the aqueous fracturing fluid into contact with an encapsulated viscosity reducing agent. The encapsulated viscosity reducing agent comprises an aqueous fluid soluble breaker for the fracturing fluid encapsulated within a membrane comprising a partially hydrolyzed acrylic crosslinked with either an aziridine prepolymer or a carbodiamide. The membrane has an embrittlement effective amount of a micron sized particulate present therein and has been cured at a temperature of at least about 115° F. such that an aqueous fluid in the fracturing fluid can contact the breaker after fracture failure of the membrane to dissolve at least a portion of the breaker and break the fracturing fluid in contact therewith.

Todd, in a patent application publication, US 2002/0036088, claims a well drilling or servicing fluid for use in producing formations. The fluid deposits a filter cake and contains water, a water soluble salt and a particulate solid bridging agent. The improvement is the particulate solid bridging agent comprising a chemically bonded ceramic oxychloride cement, magnesium oxysulfide cement, magnesium potassium phosphate hexahydrate, magnesium hydrogen phosphate trihydrate and magnesium ammonium phosphate hexahydrate. The resulting filter cake is dissolvable by an aqueous clean-up solution containing a mild organic acid, a hydrolyzable ester, an ammonium salt, a chelating agent or a mixture of an ammonium salt and a chelating agent. The '088 application suggests the use of ammonium persulfate incorporated into the bridging agent, see pgr. 0025.

Mondshine in U.S. Pat. No. 5,253,711 teaches a process for decomposing polysaccharides in alkaline aqueous systems. The process comprises using alkline earth metal or transition metal peroxides as a delayed breaker. The alkaline aqueous fluids contain a water soluble hydrophilic polysaccharide polymer hydrated within. The peroxide is activated by increasing the temperature of the fluid.

In the case of horizontal open hole drilling of unconsolidated formations, it is desirable to gravel pack the well bore after drilling the zone but before the filter cake is completely removed. The act of gravel packing the well bore annulus further limits fluid contact with the filter cake, as it both reduces the physical volume of fluid that can be present in the zone and restricts direct flow to the filter cake. As a consequence, the effectiveness of the breaking of the filter cake is dramatically reduced.

Problems also exist with many of the prior methods of removing filter cake downhole including the problem of controlling the breaking of the filter cake so that production fluids do not enter the well bore before the entire, or at least most, of filter cake is broken down. Breaking down the first portion of the filter cake with a clean-up (or breaker) fluid while the breaker fluid has not reached the remaining areas can cause premature flowing of production fluids or leaking of clean up fluids into the formation. A need exists for clean up fluids that have a delayed effect on filter cake integrity, allowing the breaker solution to be circulated across the interval before leakoff to the formation becomes a problem.

SUMMARY OF THE INVENTION

Advantageously, the composition for a filter cake removal fluid and method for removing filter cake comprises a persulfate salt that breaks down the filter cake in a controlled manner at the lower end of downhole temperature, temperatures ranging from about 65° F. to about 165° F. without the addition of activators. The higher concentrations of the persulfate within the breaker fluid, preferably ranging from 1 lb/bbl to 50 lbs/bbl, can also control the pace of the reaction. Beneficially, the breaker fluid of this invention reacts at a slow enough pace to allow the breaker fluid to circulate throughout the well bore within the formation thereby breaking the majority of the filter cake so as to avoid premature flowing of production fluids and leakoff. The method of this invention also allows for the simultaneous treatment of gravel packing and addition of a breaker fluid thereby allowing for delayed removal of the filter cake during the gravel packing process.

In the method of this invention, removing filter cake from a subterranean borehole, comprises drilling the borehole with a drill-in fluid comprising a polymer to form a filter cake. The filter cake is then contacted with a mixture of a persulfate salt in a variable density brine. In one aspect, the persulfate salt mixture can further comprise a surfactant and/or a chelating agent. Preferably, the persulfate salt is ammonium persulfate Alternatively, the persulfate salt is selected from an alkali metal persulfate, an alkaline earth metal persulfate and combinations thereof. The alkali metal persulfate can be selected from potassium persulfate, sodium persulfate, lithium persulfate and combinations thereof and the alkaline earth metal persulfate can be selected from calcium persulfate, magnesium persulfate, and combinations thereof.

The variable density brine can be selected from $NH_4Cl$, NaCl, KCl, $CaCl_2$, $ZnCl_2$, and combinations thereof and can have a density varying within a range of from about 8.3 lbs/gal. to about 12.8 lbs/gal., preferably within a range of from about 8.5 lbs/gal. to about 10.4 lbs/gal.

The mixture preferably is allowed to remain at the downhole temperatures ranging from 65° F. to 165° F. for a period of time effective to degrade the polymer filter cake. More preferably, the temperature ranges from about 70° F. to 160° F. and the period of time is at least 4 hours.

The decomposed filter cake can then be flushed away with a low concentration organic or non-organic acid. In another aspect of this invention, the polymer is selected from a water-soluble organic polymer, a water dispersible organic polymer, a water soluble bio-polymer, a water dispersible bio-polymer and combinations thereof.

In an alternative embodiment of this invention, the method of removing filter cake from a subterranean borehole comprises drilling the borehole with a drill-in fluid comprising a polymer to form a filter cake and then contacting the filter cake with a mixture of a persulfate salt in a variable density bromide or chloride brine. The brine can be selected from $NH_4Cl$, $NH_4Br$, NaCl, NaBr, KCl, KBr, $CaCl_2$, $CaBr_2$, $ZnCl_2$, $ZnBr_2$, and combinations thereof. In this preferred method, the mixture is allowed to remain at the downhole temperatures below 104° F., preferably within a range of 65° F. to 104° F., for a period of time effective to degrade the polymer filter cake. The same variations of persulfate can be used in this method. The density, however, varies within a range of from about 8.3 lbs/gal. to about 18 lbs/gal.

A composition for a filter cake removal fluid can comprise a solution of a persulfate salt in a brine, the concentration of persulfate effective for oxidation at temperatures between 65° F. to 180° F. The solution of a persulfate salt in a brine can have a density within a range of about 8.3 lbs/gal to about 12.8 lbs/gal. Preferably, the concentration of persulfate is effective for oxidation at temperatures between 65° F. to 165° F. The persulfate salt can be selected from ammonium persulfate, an alkali metal persulfate, an alkaline earth metal persulfate and combinations thereof.

Preferably, the steps for this preferred method include: installing gravel pack screens and tool assemblies into the borehole. Thereafter introducing sand in a non-viscosified carrier into the borehole and introducing a filter cake removal fluid in the well bore, in contact with a subterranean formation containing the hydrocarbons to be produced, for a duration effective to substantially remove the filter cake in the vicinity of the subterranean formation. The filter cake removal fluid preferably comprises a solution of a persulfate salt in a brine having a density within a range of about 8.3 lbs/gal to about 12.8 lbs/gal and the persulfate is effective for oxidation at temperatures between 65° F. to 165° F. The effective concentration of persulfate ranges from about 1 lb/bbl to about 50 lbs/bbl, preferably from about 4 lb/bbl to about 48 lbs/bbl.

DETAILED DESCRIPTION OF THE INVENTION

In the method of this invention, filter cake formed on the walls of a subterranean borehole is removed by contacting the filter cake with a breaker fluid comprising a persulfate. Filter cakes are tough coatings that reduce the permeability of formation walls. Formed during the drilling stage to limit losses from the well bore and protect the formation from possible damage by fluids and solids within the well bore, filter cake layers must be removed from the hydrocarbon-bearing formation so that the formation wall is restored to its natural permeability to allow for hydrocarbon production or cementing.

Filter cakes are typically formed with polymers that encapsulate particles or solids which form a bridge over the pores of the formation. Drill-in fluids, including any bridging agents and polymers, especially polysaccharides, contained within the drilling fluid are well known in the art. In one preferred method of this invention, removing filter cake from a subterranean borehole, comprises drilling the borehole with a drill-in fluid comprising a polymer to form a filter cake. Preferably, the borehole is drilled while circulating a mud therein which comprises a polymer. The polymer is selected from a water soluble organic polymer, a water dispersible organic polymer, a water soluble bio-polymer, a water dispersible bio-polymer and combinations thereof. For example, the polymer selected can be a cationic starch, a anionic starch or a nonionic starch. Optionally, the drill-in fluid comprises finely divided solids dispersed therein to form a filter cake on surfaces of the borehole. Other additives can be used for stabilizing and viscosifying.

When the bore hole is ready for production, the filter cake must be removed to allow for permeability of the formation walls. To remove the filter cake, the filter cake is contacted with a mixture of a persulfate salt in a variable density brine. In one aspect, the persulfate salt mixture can further comprise a surfactant and/or a chelating agent. Preferably, the persulfate salt is ammonium persulfate. Alternatively, the persulfate salt is selected from an alkali metal persulfate, an alkaline earth metal persulfate and combinations thereof. The alkali metal persulfate can be selected from potassium persulfate, sodium persulfate, lithium persulfate and combinations thereof and the alkaline earth metal persulfate can be selected from calcium persulfate, magnesium persulfate, and combinations thereof. In one aspect the effective concentration of persulfate ranges from about 1 lb/bbl to about 50 lbs/bbl, preferably from about 4 lb/bbl to about 48 lbs/bbl.

Break time can be controlled by the concentration of the persulfate oxidizer within the brine and also varies with downhole temperature. Increasing the concentration or at higher downhole temperatures results in increased oxidation activity.

The variable density brine can be selected from $NH_4Cl$, NaCl, KCl, $CaCl_2$, $ZnCl_2$, and combinations thereof and, with these chloride brines, can have a density varying within a range of from about 8.3 lbs/gal. to about 12.8 lbs/gal, preferably within a range of from about 8.5 lbs/gal. to about 10.4 lbs/gal.

Downhole temperatures differ according to the depth and location of the formation. The filter cake removal fluid of this invention is optimally used at lower downhole temperatures. In one preferred method, the mixture is allowed to remain at the downhole temperatures ranging from 65° F. to 165° F. for a period of time effective to degrade the polymer filter cake, ranging from about 3.5 to about 48 hours or more, depending on the state of well operations at the time. More preferably, the temperature ranges from about 70° F. to 160° F. and the period of time the mixture remains in contact with the filter cake is at least 4 hours. The decomposed filter cake can then be flushed away with a low concentration organic or non-organic acid as commonly known in the art to increase permeability.

In an alternative embodiment of this invention, the method of removing filter cake from a subterranean borehole comprises contacting the filter cake with a mixture of a persulfate salt in a variable density bromide or chloride brine. The brine can be selected from $NH_4Cl$, $NH_4Br$, NaCl, NaBr, KCl, KBr, $CaCl_2$, $CaBr_2$, $ZnCl_2$, $ZnBr_2$, and combinations thereof. In this preferred method, the mixture is allowed to remain at the downhole temperatures below 104° F., preferably within a range of 65° F. to 104° F., for a period of time effective to degrade the polymer filter cake. The persulfate salt is selected from ammonium persulfate, an alkali metal persulfate, an alkaline earth metal persulfate and combinations thereof. The density, however, varies within a range of from about 8.3 lbs/gal. to as high as about 18 lbs/gal. if a bromide brine is used.

A preferred composition for a filter cake removal fluid can comprise a solution of a persulfate salt in a brine, the concentration of persulfate effective for oxidation at temperatures between 65° F. to 180° F., preferably, between 65° F. to 165° F. Preferably concentration of persulfate ranges from about 1 lb/bbl to about 50 lbs/bbl, preferably from about 4 lbs/bbl to about 48 lbs/bbl, and more preferably, the concentration ranges from 16 lbs/bbl to 48 lbs/bbl. The solution of a persulfate salt in a brine can have a density within a range of about 8.3 lbs/gal to about 12.8 lbs/gal. The persulfate salt is preferably selected from ammonium persulfate, an alkali metal persulfate, an alkaline earth metal persulfate and combinations thereof.

Preferably, the steps for this preferred method include: installing gravel pack screens and tool assemblies into the borehole. Thereafter introducing sand in a non-viscosified carrier into the borehole; and introducing a filter cake removal fluid in the well bore, in contact with a subterranean formation containing the hydrocarbons to be produced, for a duration effective to substantially remove the filter cake in the vicinity of the subterranean formation. The filter cake removal fluid preferably comprises a solution of a persulfate salt in a brine having a density within a range of about 8.3 lbs/gal to about 12.8 lbs/gal and the persulfate is effective for oxidation at temperatures between 65° F. to 165° F.

Fluid loss pills can be used to form the filter cake. In an alternative method of removing filter cake from an existing subterranean borehole in which a fluid loss pill is used, the method comprises placing a fluid loss pill into the borehole, the fluid loss pill having a polymer to form a filter cake. In this method the polymer is selected from a water soluble organic polymer, a water dispersible organic polymer, a water soluble bio-polymer, a water dispersible bio-polymer and combinations thereof. The filter cake is contacted with a mixture of a persulfate salt in a variable density brine. The persulfate is preferably selected from ammonium persulfate, alkali metal persulfate, alkaline earth metal persulfate and combinations thereof and the brine can be selected form $NH_4Cl$, NaCl, KCl, $CaCl_2$, $ZnCl_2$, and combinations thereof. In this method the mixture is allowed to remain at the downhole temperatures ranging from 65° F. to 165° F. for a period of time effective to degrade the polymer filter cake. Alternatively the brine is selected from $NH_4Cl$, $NH_4Br$, NaCl, NaBr, KCl, KBr, $CaCl_2$, $CaBr_2$, $ZnCl_2$, $ZnBr_2$ and combinations thereof and allowing the mixture to remain at the downhole temperatures ranging from 65° F. to 104° F. for a period of time effective to degrade the polymer filter cake.

In another aspect, the mixture of persulfate salt in a variable density brine further comprises a chelating agent.

High permeability, soft sandstone formations, often found in horizontal drilling, generally require some form of barrier for hole stability. Gravel packing is used to improve hole stability in these conditions. During the practice of this invention one method of removing filter cake from a subterranean borehole, comprises drilling the borehole while circulating a mud therein which comprises a polymer, the polymer is selected from a water soluble organic polymer, a water dispersible organic polymer, a water soluble bio-polymer, a water dispersible bio-polymer and combinations thereof.

Following the drilling of a well, when fluid losses are acceptable for the proposed pumping pressures, gravel or sand packing can begin. First the drill-in fluid is displaced with a first clear fluid, which is otherwise similar to the drilling fluid. The well bore is maintained in a slightly overbalanced state. Gravel pack screens and tool assemblies are run into the bore. During this stage, it is desirable to maintain the filter cake with as little fluid loss to the production formation as possible. Following displacement of the drilling fluid, the well is gravel packed. In a preferred procedure, the gravel, preferably sized sand, about 20–30 U.S. mesh, is placed into a nonviscosified carrier, such as a brine. Advantageously, the method of this invention comprises the simultaneous application of persulfate with the gravel pack. At the same time, or at a later time, persulfate can be added to the gravel pack. Alternatively, persulfate can be added independently of the gravel pack and also used in systems that do not employ gravel packing.

As the low viscosity fluid cannot transport a significant amount of solids, the sand concentrations are usually from about 60 g/l to 360 g/l and pump rates approach 1 m$^3$/min. The hydrostatic overbalance that arises from the pumping pressure necessary to achieve these rates is desirable since the overbalance holds the filter cake in place. A filter cake removal fluid is then introduced in the wellbore, in contact with a subterranean formation containing the hydrocarbons to be produced, for a duration effective to substantially remove the filter cake in the vicinity of the subterranean formation. Preferably, the filter cake removal fluid comprises a solution of a persulfate salt in a brine having a density within a range of about 8.3 lbs/gal to about 12.8 lbs/gal and effective for oxidation at temperatures between 65° F. to 165° F. The non-viscosified carrier for the sand can comprise the filter cake removal fluid.

In the practice of this invention, other additives, such as clay treating additives, pH control agents, lubricants, non-emulsifying agents, iron control agents and the like can be included within the filter cake removal fluid or gravel pack fluid as desired.

EXAMPLES

The following examples illustrate the use of persulfate salt in the breaking of filter cakes containing different polymers in different brines at relatively low temperatures. Examples at four different temperatures are provided. Tables illustrate the increase in break time achievable either by an increase in temperature (Table 1) or by an increase in breaker (persulfate) concentration (Tables 2 & 3).

Drill in Fluid Formulations (S.G. 1.162)

| Component (Quantities in Grams / liters) | Formulation # | | |
|---|---|---|---|
| | 1 | 2 | 3 |
| Water | 419.14 | 419.1 | 419.14 |
| NaCl (SG = 1.199) Brine | 621.42 | 621.4 | 621.42 |
| Cationic Starch | 13.70 | — | — |
| Anionic Starch | — | 13.70 | — |
| Nonionic Starch | — | — | 13.70 |
| Sodium Thiosulfate | 0.71 | 0.71 | 0.71 |
| Magnesium Oxide | 2.86 | 2.86 | 2.86 |
| Xanthan Biopolymer | 3.42 | 3.42 | 3.42 |
| Sized Calcium Carbonate #1 * | 42.86 | 42.86 | 42.86 |
| Sized Calcium Carbonate #2 ** | 42.86 | 42.86 | 42.86 |
| Shale Stabilizer (Proprietary glycol blend) | 30.86 | 30.86 | 30.86 |

* Sized Calcium Carbonate #1 (3 microns to 400 microns), (1 micron = 1/1000 inch)
** Sized Calcium Carbonate #2 (1 micron to 36 microns)

Experimental Procedures

The NaCl brine was a stock commercial product marketed by TETRA Technologies, Inc. The cationic starch (HPS) was cross-linked and commercially available from TETRA Technologies, Inc. The other two starches available commercially were also cross-linked. The sodium thiosulfate and magnesium oxide were USP grade. The xanthan biopolymer is available from several suppliers. The sized calcium carbonate is available from TETRA Technologies under the trade designation TETRA PayZone® Carb-Prime, and TETRA PayZone® Carb-Ultra, respectively.

The breaker or clean-up fluid for the examples below was a solution of ammonium persulfate (1–48 lb/bbl) in a sodium chloride or bromide brine (1.162 g/ml). Break time was controlled by variation of breaker temperature of concentration as illustrated in Tables 1–3 below.

The following mixing procedure was followed for all laboratory tests. After the addition of the starch (and before addition of the next ingredients), the mixture was sheared with a high-shear (Silversen type) mixer for 30 seconds, and then mixed at 500 RPM using a low-shear Servodyne unit for 30 minutes. This shearing process is intended to simulate mixing with a high shear centrifugal pump, and then the slow mechanical rolling of a field mixing unit. The shearing/mixing procedure was repeated after the addition of the next three ingredients, the thiosulfate, magnesium oxide and xanthan. A third mixing for 30 minutes was run after adding the carbonates.

Rheological properties were then measured (heating only the sample used for testing to 120° F.), and the samples were "hot-rolled" at 149° F. in a Baroid roller oven for 16 hours. After the 'hot rolling', the Theological properties were again measured at 120° F., and the samples were then tested for "filter cake removal" in the following manner.

The permeability of a 10- or 5-microns ceramic disk was first determined in both directions of flow at 35 KPa and ~68° F. F. Next, a filter cake was built using a standard high temperature, high pressure cell (HTHP cell). The 10- or 5-microns ceramic disk was used as the filtering medium with the cell filled with the test drill-in fluid.

The filter cake preparations were run at test temperature over 24 hours, with a squeeze pressure of 2100 KPa applied to the fluid. The filtrate was collected and measured during this time. A filter cake was produced that had an initial spurt fluid loss as the filter cake is building, but then had a rapid decline as the filter cake limited further fluid loss. At the end of the cake building time (24 hrs), the cell was cooled and the pressure released. The remaining fluid was drained from the cell, and the filter cake which had been formed was examined visually for uniformity. Visually, the amount of corrosive by-products was less as compared to other breaker systems.

Following the visual examination, the breaker fluid was added to the HTHP cell and the cell was pressurized (usually to 700 Pa) and the temperature adjusted. After the breaker fluid had broken through the filter cake, the fluid, if any remained, was removed from the cell, and tests to establish the recovery of the permeability of the ceramic disk were performed. This part of the testing was run in the normal direction, with the disk (and filter cake on it) at the cell bottom and the treating fluid carefully poured in on top of it. This fluid was injected in the same direction as the drill-in fluid to simulate the injection of a clean-up fluid in field practice. Consequently the permeability determined in this direction is called the recovered injection permeability. The test is repeated in the opposite direction, again at 35 KPa and ambient temperature (~65–70° F. F). This flow was in the production direction of an actual well and is called the recovered production permeability.

Example 1

A filter cake as described above was prepared using formulation #1. The cake was prepared over 24 hrs using a 1.16 g/ml NaCl brine and 700 KPa differential pressure. After 4 hours, less than 4 ml of filtrate had been produced and the injection permeability was essentially zero. A breaker fluid was applied at 67° F. F and 700 KPa (32 lb/bbl ammonium persulfate). The treating fluid broke through in 24 hours flowing at about 3 ml/hr. After about 2 hours additional time, the flow rate had increased to about 5 ml/min, and the test was terminated after 120 ml of the breaker fluid had been passed through the cell. The cell was allowed to cool and pressure was released. The filter cake was visually inspected and found to be composed of discrete carbonate particles with no evidence of starch or polymer. A recovered permeability test was run in the injection direction, with 3% recovered permeability. Recovered permeability testing in the production direction gave 64% of the original permeability recovered.

An acid flush (5% solution of HCl in 1.162 g/ml NaCl) was poured into the cell and the cell was sealed to allow the acid to leak through by self generated pressure. This process was intended to simulate the spotting (but not injection) of acid in a balanced hydrostatic condition. Immediately, the acid started to break through, and after ~20 minutes all of the acid had passed through. The recovered permeability was 98% in the production direction and 95% in the injection direction.

Example 2

A test similar to that in Example 1 was run, except formulation #2 with an anionic starch rather than a cationic one was used. The total fluid loss was about 30 ml in 24 hrs. After 24 hrs the cell was opened and emptied of the drill-in fluid. Breaker solution (120 ml), same as that used in Example 1 (32 lb/bbl persulfate salt), was added to the cell. The breaker fluid started to break through in 24 hours with a flow rate of ~3.0 gram/hr. The breaker treatment was terminated after 34 hrs, during which time 64% of the breaker fluid had passed through the cell. The cell was allowed to cool and pressure was released. The filter cake was visually inspected and found to be composed of discrete carbonate particles with no evidence of any remaining starch or polymer. A recovered permeability examination run in the injection direction gave only 3% recovered permeability. In the production direction, however, 66% of the original permeability was recovered.

The remaining filter cake was then treated with acid as in Example 1 (5% HCl in 1.162 g/ml NaCl). The recovered permeabilities were 97% in the production direction and 95% in the injection direction.

Example 3

Using formulation #3, with a nonionic starch, filter cake build-up and treatment soaks were performed in the same manner as for Examples 1 and 2. Treatment with the breaker fluid (32 lb/bbl persulfate salt) used in Examples 1 and 2 at ~68° F. gave 5% recovered permeability in the injection direction and 62% in the production direction without acid treatment.

Example 4

Using formulation #1, a filter cake was prepared at 104° F. and 2100 KPa. The breaker fluid (24 lb/bbl persulfate salt) was applied as in previous examples but at 104° F. and 700 Pa. The breaker fluid started to break through in 15 hours, flowing at about 2.5 gram/hr. After an additional 10 hours, the breaker treatment was terminated after 56% of the treating fluid had been displaced through the cell. As in the previous example, the remaining filter cake was found to be composed of discrete carbonate particles with no evidence of starch or polymer. Recovered permeabilities were 20% in the injection direction and 78% in the production direction. The recovered permeabilities after acid treatment were 100% in both directions.

Example 5

Using formulation #1 a filter cake was prepared at 140° F. and 2100 KPa by the procedure described previously. The breaker fluid (24 lb/bbl breaker) was applied to the filter cake at 135° F. and 700 KPa. After one hour the breaker fluid started to slowly break through, flowing at about ~0.02 gram/min. After an additional 40 minutes, 137 ml of the fluid had passed through the cell and the run was terminated. Inspection of the filter cake revealed the presence of only carbonate, no starch or polymer. Recovered permeabilitites were 3% and 54% in the injection and production directions, respectively.

Treatment of the remaining cake with acetic acid (10 wt % in 1.162 g/ml NaCl) gave recovered permeabilities of 30% and 64% in the injection and production directions.

Example 6

Using a modified formulation #1 in which sodium bromide replaced sodium chloride, a filter cake was prepared at 158° F. and 2100 KPa by the procedure described previously. The breaker fluid (48 lb/bbl breaker in 1.162 g/ml NaBr) was applied to the filter cake at 158° F. and 700 KPa. After 4.25 hours the fluid had broken completely through the cake. Inspection of the filter cake revealed the presence of only carbonate, no starch or polymer. Recovered permeabilitites were 48% and 81% in the injection and production directions, respectively. Treatment of the remaining cake with acetic acid (10 vol. % in 1.162 g/ml NaBr) gave recovered permeabilities of 100% in both the injection and production directions.

Examples 7–11

Examples 7–9 were run with formulation # 1 at varying concentrations of breaker at 100° F., and examples 10 and 11 at 160° F. See Table 1.

Example 12

A filter cake was prepared using formulation #1 as described previously. An initial soak of 24 hours was tried using The filter cake was treated with a NaCl brine (1.16 g/ml) containing no breaker (0.0 lb/bbl ammonium persulfate) at room temperature (65° F.–70° F.) and 700 KPa differential pressure for 24 hrs. Fluid loss was less than 4 ml up to 4 hours. After that time there was no more fluid loss and the injection permeability was essentially zero.

The cell was loaded again with sodium bromide brine (1.16 g/ml) and examined for 4 more hours. No additional breakthrough of fluid was noted. Similar examination with a calcium chloride brine (1.16 g/ml) for an additional 4 hours gave no fluid loss. The recovered permeability in both the injection and production directions was less than 2%.

TABLE 1

Effect of Break Time with Temperature

| Example Number | Temperature (° F.) | Breaker Time (Hours) | Breaker * Concentration (Lb/bbl) | % Recovered Production Permeability | % Recovered Permeability (After Acid) |
|---|---|---|---|---|---|
| 4 | 104 | 26 | 24 | 78 | 100 |
| 5 | 135 | 1.6 | 24 | 54 | 64 |

* Ammonium persulfate

TABLE 2

Effect of Break Time with Persulfate Concentration @ 100° F.

| Example Number | Breaker * Concentration (Lb/bbl) | Breaker Time (Hours) | % Recovered Production Permeability | % Recovered Permeability After Acid |
|---|---|---|---|---|
| 7 | 16 | 48 | 90 | 100 |
| 8 | 24 | 24 | 78 | 100 |
| 9 | 32 | 14 | 80 | 98 |

* Ammonium persulfate

TABLE 3

Effect of Break Time with Persulfate Concentration @ 160° F.

| Example Number | Breaker * Concentration (Lb/bbl) | Breaker Time (Hours) | % Recovered Production Permeability | % Recovered Permeability (After Acid) |
|---|---|---|---|---|
| 10 | 1 | 48 | 47 | 72 |
| 11 | 4 | 8.5 | 67 | 83 |

* Ammonium persulfate

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. A method of removing filter cake from a subterranean borehole, comprising:
   drilling the borehole with a drill-in fluid comprising a polymer to form a filter cake;
   contacting the filter cake with a mixture of a persulfate salt in a variable density brine in the absence of an activating agent; and
   allowing the mixture to remain at the downhole temperatures ranging from 65° F. to 165° F. for a period of time effective to degrade the polymer filter cake.

2. The method of claim 1 further comprising the step of flushing away the decomposed filter cake with a low concentration organic or non-organic acid.

3. The method of claim 1 wherein the polymer is selected from a water soluble organic polymer, a water dispersible organic polymer, a water soluble bio-polymer, a water dispersible bio-polymer and combinations thereof.

4. The method of claim 1 wherein the mixture of persulfate salt in a variable density brine further comprises a surfactant.

5. The method of claim 1 wherein the mixture of persulfate salt in a variable density brine further comprises a chelating agent.

6. The method of claim 1 herein the persulfate salt is ammonium persulfate.

7. The method of claim 1 wherein the persulfate salt is selected from an alkali metal persulfate, an alkaline earth metal persulfate and combinations thereof.

8. The method of claim 7 herein the alkali metal persulfate is selected from potassium persulfate, sodium persulfate, lithium persulfate and combinations thereof.

9. The method of claim 7 herein the alkaline earth metal persulfate is selected from calcium persulfate, magnesium persulfate, and combinations thereof.

10. The method of claim 1 wherein the variable density brine is selected from $NH_4Cl$, $NaCl$, $KCl$, $CaCl_2$, $ZnCl_2$, and combinations thereof.

11. The method of claim 1 wherein the density of the brine varies within a range of from about 8.3 lbs/gal. to about 12.8 lbs/gal.

12. The method of claim 1 wherein the density of the brine varies within a range of from about 8.5 lbs/gal. to about 10.4 lbs/gal.

13. The method of claim 1 wherein the temperature ranges is from about 70° F. to 160° F.

14. The method of claim 1 wherein the period of time to degrade the filter cake is at least 4 hours.

15. A method of removing filter cake from a subterranean borehole, comprising:
    drilling the borehole with a drill-in fluid comprising a polymer to form a filter cake;
    contacting the filter cake with a mixture of a persulfate salt in a variable density brine in the absence of an activating agent, the brine selected from $NH_4Cl$, $NH_4Br$, $NaCl$, $NaBr$, $KCl$, $KBr$, $CaCl_2$, $CaBr_2$, $ZnCl_2$, $ZnBr_2$, and combinations thereof; and
    allowing the mixture to remain at the downhole temperatures below 104° F. for a period of time effective to degrade the polymer filter cake.

16. The method of claim 15 herein the persulfate salt is ammonium persulfate.

17. The method of claim 15 herein the persulfate salt is selected from an alkali metal persulfate, an alkaline earth metal persulfate and combinations thereof.

18. The method of claim 17 herein the alkali metal persulfate is selected from potassium persulfate, sodium persulfate, lithium persulfate and combinations thereof.

19. The method of claim 17 herein the alkaline earth metal persulfate is selected from calcium persulfate, magnesium persulfate, and combinations thereof.

20. The method of claim 15 herein the density of the brine varies within a range of from about 8.3 lbs/gal. to about 18 lbs/gal.

21. A method of removing filter cake from a subterranean borehole, comprising:
    drilling the borehole with a drill-in fluid comprising a polymer to form a filter cake;
    contacting the filter cake with a mixture of a persulfate salt in a variable density brine in the absence of an activating agent, the brine selected from $NH_4Cl$, $NH_4Br$, $NaCl$, $NaBr$, $KCl$, $KBr$, $CaCl_2$, $CaBr_2$, $ZnCl_2$, $ZnBr_2$ and combinations thereof; and
    allowing the mixture to remain at the downhole temperatures ranging from 65° F. to 104° F. for a period of time effective to degrade the polymer filter cake.

22. A method of removing filter cake from a subterranean borehole, comprising:
    drilling the borehole with a drill-in fluid comprising a polymer to form a filter cake;

contacting the filter cake with a mixture of a persulfate salt in a brine in the absence of an activating agent, the density of the brine within a range of from about 8.5 lbs/gal. to about 10.4 lbs/gal; and allowing the mixture to remain at the downhole temperatures ranging from 65° F. to 165° F. for a period of time effective to degrade the polymer filter cake.

23. A method of removing filter cake from a subterranean borehole, comprising:

drilling the borehole with a drill-in fluid comprising a polymer to form a filter cake;

contacting the filter cake with a mixture of a persulfate salt in a variable density brine in the absence of an activating agent, the brine selected from $NH_4Cl$, $NH_4Br$, NaCl, NaBr, KCl, KBr, $CaCl_2$, $CaBr_2$, $ZnCl_2$, $ZnBr_2$ and combinations thereof;

allowing the mixture to remain at the downhole temperatures ranging from 65° F. to 135° F. for a period of time effective to degrade the polymer filter cake.

24. A method of removing filter cake from a subterranean borehole, comprising:

drilling the borehole while circulating a mud therein which comprises a polymer, the polymer is selected from a water soluble organic polymer, a water dispersible organic polymer, a water soluble bio-polymer, a water dispersible bio-polymer and combinations thereof, and optionally comprises finely divided solids dispersed therein to form a filter cake on surfaces of the borehole;

thereafter installing gravel pack screens and tool assemblies into the borehole;

thereafter introducing sand in a non-viscosified carrier into the borehole; and introducing a filter cake removal fluid in the well bore, in contact with a subterranean formation containing hydrocarbons to be produced, for a duration effective to substantially remove the filter cake in the vicinity of the subterranean formation, wherein the filter cake removal fluid comprises a solution of a persulfate salt in a brine having a density within a range of about 8.3 lbs/gal to about 12.8 lbs/gal, the persulfate effective for oxidation at temperatures between 65° F. to 165° F.

25. The method of claim 24 wherein the non-viscosified carrier for the sand comprises said filter cake removal fluid.

26. A method of removing filter cake from an existing subterranean borehole, comprising:

placing a fluid loss pill into the borehole, the fluid loss pill comprising a polymer to form a filter cake;

contacting the filter cake with a mixture of a persulfate salt in a variable density brine; and allowing the mixture to remain at the downhole temperatures ranging from 65° F. to 165° F. for a period of time effective to degrade the polymer filter cake.

27. A method of removing filter cake from an existing subterranean borehole, comprising:

placing a fluid loss pill into the borehole, the fluid loss pill comprising a polymer to form a filter cake, the polymer is selected from a water soluble organic polymer, a water dispersible organic polymer, a water soluble bio-polymer, a water dispersible bio-polymer and combinations thereof;

contacting the filter cake with a mixture of a persulfate salt in a variable density brine, the persulfate selected from ammonium persulfate, alkali metal persulfate, alkaline earth metal persulfate and combinations thereof, the brine selected form $NH_4Cl$, NaCl, KCl, $CaCl_2$, $ZnCl_2$, and combinations thereof; and allowing the mixture to remain at the downhole temperatures ranging from 65° F. to 165° F. for a period of time effective to degrade the polymer filter cake.

28. The method of claim 26 wherein the mixture of persulfate salt in a variable density brine further comprises a chelating agent.

29. A method of removing filter cake from an existing subterranean borehole, comprising:

placing a fluid loss pill into the borehole, the fluid loss pill comprising a polymer to form a filter cake, the polymer selected from a water soluble organic polymer, a water dispersible organic polymer, a water soluble bio-polymer;

contacting the filter cake with a mixture of a persulfate salt in a variable density brine, the brine selected from $NH_4Cl$, $NH_4Br$, NaCl, NaBr, KCl, KBr, $CaCl_2$, $CaBr_2$, $ZnCl_2$, $ZnBr_2$ and combinations thereof; and allowing the mixture to remain at the downhole temperatures ranging from 65° F. to 104° F. for a period of time effective to degrade the polymer filter cake.

\* \* \* \* \*